(12) United States Patent
Sohn (10) Patent No.: US 8,526,332 B2
(45) Date of Patent: Sep. 3, 2013

(54) METHOD AND APPARATUS OF DETECTING RESOURCE ASSIGNMENT INFORMATION IN WIRELESS COMMUNICATION SYSTEM

(75) Inventor: Kyung Yeol Sohn, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 279 days.

(21) Appl. No.: 12/987,543

(22) Filed: Jan. 10, 2011

(65) Prior Publication Data

US 2012/0106368 A1 May 3, 2012

(30) Foreign Application Priority Data

Nov. 1, 2010 (KR) ........................ 10-2010-0107425

(51) Int. Cl.
*H04L 12/28* (2006.01)
(52) U.S. Cl.
USPC ........... 370/255; 370/206; 370/208; 370/329; 370/341; 370/395.3; 370/462
(58) Field of Classification Search
USPC .............. 370/206, 208, 255, 329, 341, 395.3, 370/462
See application file for complete search history.

(56) References Cited

U.S. PATENT DOCUMENTS

| 2008/0212506 | A1 | 9/2008 | Lee et al. | |
|---|---|---|---|---|
| 2010/0111015 | A1* | 5/2010 | Kim et al. | 370/329 |
| 2010/0254336 | A1* | 10/2010 | Lee et al. | 370/329 |
| 2011/0199990 | A1* | 8/2011 | Chang et al. | 370/329 |
| 2011/0255499 | A1* | 10/2011 | Kim et al. | 370/329 |
| 2012/0106368 | A1* | 5/2012 | Sohn | 370/252 |

FOREIGN PATENT DOCUMENTS

| KR | 10-2009-0050132 | 5/2009 |
|---|---|---|
| KR | 10-2010-0027301 | 3/2010 |
| KR | 10-2010-0047115 | 5/2010 |

* cited by examiner

*Primary Examiner* — Benjamin H Elliott, IV
(74) *Attorney, Agent, or Firm* — Staas & Halsey LLP (57) ABSTRACT

A method and apparatus of detecting resource assignment information by a user equipment (UE) in a wireless communication system is provided. The UE detects a number of Assignment Advanced-MAP (A-A-MAP) groups and a number of a plurality of A-A-MAP Information Elements (IEs) included in each of the A-A-MAP groups, extracts type and flag of each of the plurality of A-A-MAP IEs; and performs blind detection of resource assignment information on the basis of the type and flag of each of the A-A-MAP IEs.

11 Claims, 7 Drawing Sheets

FIG. 7

METHOD AND APPARATUS OF DETECTING RESOURCE ASSIGNMENT INFORMATION IN WIRELESS COMMUNICATION SYSTEM

CROSS-REFERENCE TO RELATED APPLICATIONS

This application claims the benefit of priority of Korean Patent application No. 10-2010-0107425 filed on Nov. 1, 2010, which is incorporated by reference in their entirety herein.

BACKGROUND OF THE INVENTION

1. Field of the Invention

The present invention relates to wireless communication and, more particularly, to a method and apparatus of detecting resource assignment information in a wireless communication system.

2. Related Art

An IEEE (Institute of Electrical and Electronics Engineers) 802.16e standard has been adopted by the name of 'WMAN-OFDMA TDD' as a sixth standard for IMT (International Mobile Telecommunication)-2000 in the ITU-R (ITU-Radio communication Sector) under the control of the year 2007 ITU (International Telecommunication Union) and. The ITU-R is preparing for an IMT-Advanced system which is the next-generation 4G mobile communication standard since the IMT-2000. IEEE 802.16 WG (Working Group) has decided to go ahead with an IEEE 802.16m project with the object of writing an amendment standard of the existing IEEE 802.16e which is a standard for the IMT-Advanced system at the end of the year 2006. As can be seen from the above object, the IEEE 802.16m standard involves the two aspects of the past continuation (i.e., the amendment of the IEEE 802.16e standard) and the future continuation (i.e., the standard for the next-generation IMT-Advanced system). Accordingly, the IEEE 802.16m standard is required to satisfy all advanced requirements for the IMT-Advanced system while maintaining compatibility with a Mobile WiMAX system based on the IEEE 802.16e standard.

In the case of wideband wireless communication systems, effective transmission and reception schemes and utilization schemes thereof have been proposed in order to maximize the efficiency of limited radio resources. The wideband wireless communication system may use Orthogonal Frequency Division Multiplexing (OFDM)/Orthogonal Frequency Division Multiple Access (OFDMA) schemes. In the OFDM/OFDMA schemes, a signal is transmitted by using a plurality of sub-carriers, and thus high speed transmission of data is possible.

In the IEEE 802.16m system, a base station may transmit information about uplink or downlink resource assignment every subframe in order to freely assign uplink or downlink. Such transmission may be performed through an Assignment Advanced-MAP (A-A-MAP) transmitted through an Advanced-MAP (A-MAP) region which is a physical resource region. The A-A-MAP includes pieces of resource assignment information which are classified into several types of A-A-MAP Information Elements (IEs). Each of the A-A-MAP IEs is segmented and coded, and it carries information about one terminal or terminal group.

A terminal is required to restore a plurality of segmented A-A-MAP IEs to A-A-MAP IEs before the segmentation by performing blind detection for each of the A-A-MAP IEs in order to obtain an accurate number of A-A-MAP IEs which is used in resource assignment of uplink and downlink. Accordingly, there is a need for an efficient method of detecting resource assignment information.

SUMMARY OF THE INVENTION

The present invention provides a method and apparatus for detecting resource assignment information in a wireless communication system.

In an aspect, a method of detecting resource assignment information by a user equipment (UE) in a wireless communication system is provided. The method include detecting a number of Assignment Advanced-MAP (A-A-MAP) groups and a number of a plurality of A-A-MAP Information Elements (IEs) included in each of the A-A-MAP groups, extracting a type and flag of each of the plurality of A-A-MAP IEs, and performing blind detection of resource assignment information on the basis of the type and flag of each of the A-A-MAP IEs.

The type of the A-A-MAP IE may have a size of 4 bits.
The flag of the A-A-MAP IE may have a size of 1 bit.
Performing the blind detection of the resource assignment information may include determining whether a first A-A-MAP IE is a last A-A-MAP IE of an A-A-MAP group to which the first A-A-MAP IE belongs. Performing the blind detection of the resource assignment information may include performing the blind detection of resource assignment information on the basis of a type and flag of the first A-A-MAP IE and a type and flag of a second A-A-MAP anterior to the first A-A-MAP IE, in case where the first A-A-MAP IE is the last A-A-MAP IE of the A-A-MAP group. In case where the type of the first A-A-MAP IE is identical with the type of the second A-A-MAP IE, the first A-A-MAP IE is a consecutive and separated A-A-MAP IE, and the flag of the first A-A-MAP IE is 0, the blind detection of the resource assignment information may be performed by combining the first A-A-MAP IE and the second A-A-MAP IE. In case where the first A-A-MAP IE is not the last A-A-MAP IE of the A-A-MAP group, the blind detection of the resource assignment information may be performed on the basis of the type and flag of the first A-A-MAP IE and a type and flag of a third A-A-MAP IE posterior to the first A-A-MAP IE. In case where the type of the first A-A-MAP IE is identical with the type of the third A-A-MAP IE, the first A-A-MAP IE is not a consecutive and separated A-A-MAP IE, the flag of the first A-A-MAP IE is 1, and the flag of the third A-A-MAP IE is 0, the blind detection of the resource assignment information may be performed by combining the first A-A-MAP IE and the third A-A-MAP IE. In case where the type of the first A-A-MAP IE is identical with the type of the third A-A-MAP IE, the first A-A-MAP IE is a consecutive and separated A-A-MAP IE, the flag of the first A-A-MAP IE is 0, and the flag of the third A-A-MAP IE is 0, the blind detection of the resource assignment information may be performed by combining the first A-A-MAP IE and the third A-A-MAP IE. In case where the type of the first A-A-MAP IE is not identical with the type of the third A-A-MAP IE, the first A-A-MAP IE is a consecutive and separated A-A-MAP IE, and the flag of the first A-A-MAP IE is 0, the blind detection of the resource assignment information may be performed by combining the first A-A-MAP IE and the third A-A-MAP IE.

Information about the number of A-A-MAP groups and the plurality of A-A-MAP IEs included in each of the A-A-MAP groups may be transmitted through a non-user-specific A-MAP IE.

In another aspect, an apparatus for detecting resource assignment information is provided. The apparatus include a Radio Frequency (RF) unit configured to transmit or receive a radio signal, and a processor, connected to the RF unit, and configured to detect a number of A-A-MAP groups and a number of a plurality of A-A-MAP IEs included in each of the A-A-MAP groups, extract a type and flag of each of the plurality of A-A-MAP IEs, and perform blind detection of resource assignment information on the basis of the type and flag of each of the A-A-MAP IEs.

The processor may further perform the blind detection of the resource assignment information by determining whether a first A-A-MAP IE is a last A-A-MAP IE of an A-A-MAP group to which the first A-A-MAP IE belongs. In case where the first A-A-MAP IE is the last A-A-MAP IE of the A-A-MAP group, the processor may further perform the blind detection of the resource assignment information on the basis of a type and flag of the first A-A-MAP IE and a type and flag of a second A-A-MAP anterior to the first A-A-MAP IE. In case where the first A-A-MAP IE is not the last A-A-MAP IE of the A-A-MAP group, the processor may further perform the blind detection of the resource assignment information on the basis of the type and flag of the first A-A-MAP IE and a type and flag of a third A-A-MAP IE posterior to the first A-A-MAP IE.

DESCRIPTION OF EXEMPLARY EMBODIMENTS

Hereinafter, some embodiments of the present invention are described in detail with reference to the accompanying drawings in order for those skilled in the art to be able to readily implement the invention. However, the present invention may be modified in various different ways and are not limited to the following embodiments. In order to clarify a description of the present invention, parts not related to the description are omitted, and the same reference numbers are used throughout the drawings to refer to the same or like parts. Further, a description of parts which can be easily understood by those skilled in the art is omitted.

When it is said that any part "includes (or comprises)" any constituent element, it means that the corresponding part may further include other constituent elements unless otherwise described without excluding other constituent elements.

In this specification, a terminal may refer to a Mobile Station (MS), a Mobile Terminal (MT), a Subscriber Station (SS), a Portable Subscriber Station (PSS), User Equipment (UE), an Access Terminal (AT) or the like and may include some or all of the functions of the MS, the MT, the SS, the PSS, the UE, or the AT. In this specification, a Base Station (BS) may refer to an Access Point (AP), a Radio Access Station (RAS), a Node B, an evolved NodeB (eNodeB), a Base Transceiver Station (BTS), or a Mobile Multihop Relay (MMR)-BS and may include some or all of the functions of the AP, the RAS, the Node B, the eNodeB, the BTS, or the MMR-BS.

Meanwhile, downlink (DL) refers to communication from a BS to a terminal, and it may be referred to as a forward link. Uplink (UL) refers to communication from a terminal to a BS, and it may be referred to as a reverse link. In downlink, a transmitter can be a part of a BS and a receiver can be a part of an MS. In uplink, a transmitter can be a part of an MS and a receiver can be a part of a BS.

In an IEEE (Institute of Electrical and Electronics Engineers) 802.16m system, a BS may transmit information for resource assignment of uplink or downlink every subframe in order to freely assign uplink or downlink. Such transmission may be performed through an A-A-MAP transmitted through an A-MAP region which is a physical resource region. The A-A-MAP includes pieces of resource assignment information which are classified into several types of A-A-MAP IEs. Each of the A-A-MAP IEs is segmented and coded, and it carries information about one terminal or terminal group. A minimum logical resource unit constituting the A-A-MAP is a minimum logical resource unit (MLRU). One MLRU may consist of 56 data tones. Each of the A-A-MAP IEs may be transmitted through the A-MAP region in the form of one MLRU or in a form in which a plurality of consecutive MLRUs is connected.

The number of logically consecutive MLRUs may be determined on the basis of a channel coding rate and the size of an A-A-MAP IE. The channel coding rate may be selected according to a link condition of a terminal. The A-A-MAP IEs may be grouped in a group on the basis of the channel coding rate. A-A-MAP IEs belonging to the same group may be transmitted at the same channel coding rate within the same frequency partition. Alternatively, A-A-MAP IEs belonging to the same A-A-MAP group may have the same size and the same Modulation and Coding Scheme (MCS). Each of the A-A-MAP groups may include a plurality of logically consecutive MLRUs. The number of A-A-MAP IEs within each A-A-MAP group may be transmitted within the same subframe through a non-user specific A-MAP IE. The non-user specific A-MAP IE transmitted through the A-MAP region includes information not dedicated to a specific terminal or a specific terminal group.

Figure 1:
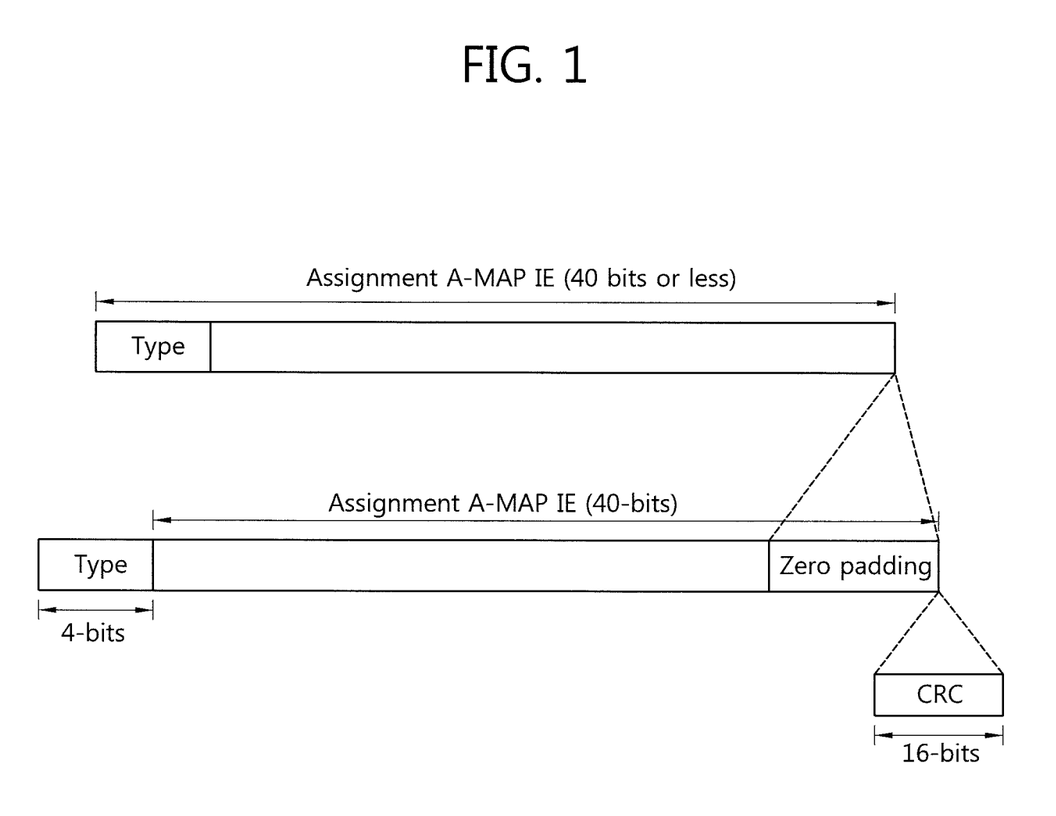
FIG. 1 shows an example of an A-A-MAP IE configuration.

FIG. 1 shows an example of an A-A-MAP IE configuration.

In general, one A-A-MAP IE has the size of 40 bits. An A-A-MAP IE type field indicating the type of an A-A-MAP IE has the size of 4 bits, and resource assignment information is mapped to the remaining segments of the A-A-MAP IE. In case where a segment in which the A-A-MAP IE type field and the resource assignment information of the A-A-MAP IE are added is smaller than 40 bits, 0 (zero) is padded behind the resource assignment information so that the A-A-MAP IE has the size of 40 bits. Accordingly, CRC of 16 bits is added to the A-A-MAP IE configured to have the size of 40 bits.

Figure 2:
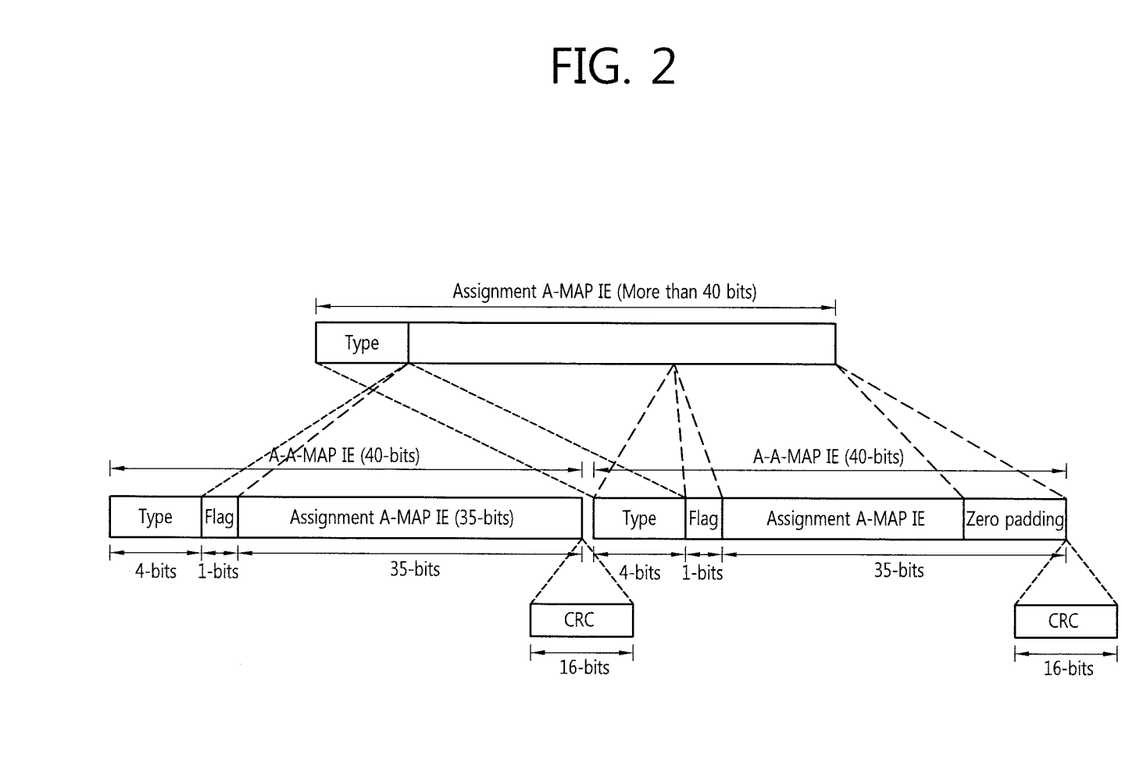
FIG. 2 shows another example of an A-A-MAP IE configuration.

FIG. 2 shows another example of an A-A-MAP IE configuration.

An A-A-MAP IE having a size greater than 40 bits may be separated into a plurality of segmented A-A-MAP IEs. Resource assignment information other than the A-A-MAP IE type field of the A-A-MAP IE is segmented per 35 bits and assigned to the respective segmented A-A-MAP IEs. Each of the segmented A-A-MAP IEs has a size of 40 bits. The segmented A-A-MAP IE is configured to have an A-A-MAP IE type field of 4 bits in size, a flag of 1 bit is size, and segmented resource assignment information of 35 bits in size. In case where the size of segmented resource assignment information within the segmented A-A-MAP IE is smaller than 35 bits, 0 (zero) is padded to behind the segmented resource assignment information such that corresponding segmented A-A-MAP IE has a size of 40 bits. Accordingly, CRC of 16 bits is added to the segmented A-A-MAP IE configured to have the size of 40 bits. Furthermore, the flag of a first segmented A-A-MAP IE, from among a plurality of segmented A-A-MAP IEs, may be set to 1, and the flags of the remaining segmented A-A-MAP IEs may be set to 0. Each of the segmented A-A-MAP IEs is segmented and coded on the basis of the same MCS, and it may occupy a plurality of logically consecutive MLRUs.

A terminal can know the number of A-A-MAP groups and the number of MLRUs using the same MCS, included in each A-A-MAP group (i.e., a total number of single or segmented A-A-MAP IEs included in each A-A-MAP group) through a non-user specific A-MAP IE. Since one A-A-MAP IE may be segmented into a plurality of segmented A-A-MAP IEs, the number of actually used A-A-MAP IEs may be less than the number of MLRUs which can be known through the non-user specific A-MAP IE.

A terminal is required to restore a plurality of segmented A-A-MAP IEs to A-A-MAP IEs before the segmentation by performing blind detection for each of the A-A-MAP IEs in order to obtain an accurate number of A-A-MAP IEs which are used in resource assignment of uplink and downlink. Accordingly, there is a need for an efficient method of detecting resource assignment information.

Figure 3:
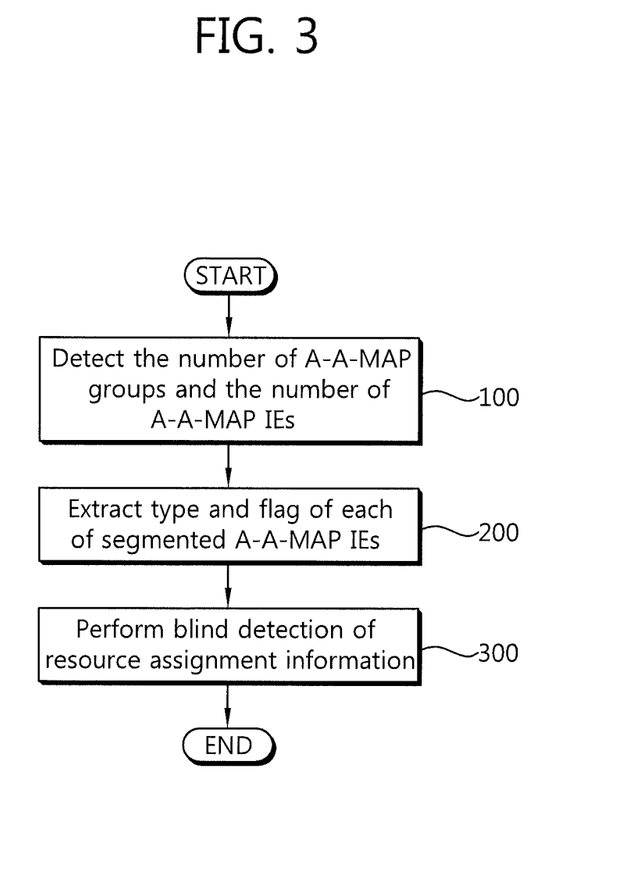
FIG. 3 shows an embodiment of a proposed method of detecting resource assignment information.

FIG. 3 shows an embodiment of a proposed method of detecting resource assignment information.

At step S100, a terminal detects the number of A-A-MAP groups and the number of A-A-MAP IEs included in each of the A-A-MAP groups. Information about the number of A-A-MAP groups and the plurality of A-A-MAP IEs included in each of the A-A-MAP groups can be transmitted through a non-user specific A-MAP IE.

At step S200, the terminal extracts the type and flag of each of the A-A-MAP IEs. The A-A-MAP type field may be 4 bits in size, and the flag of the A-A-MAP IE may be 1 bit in size.

At step 300, the terminal performs blind detection of resource assignment information on the basis of the type and flag of each of the A-A-MAP IEs.

Figure 4:
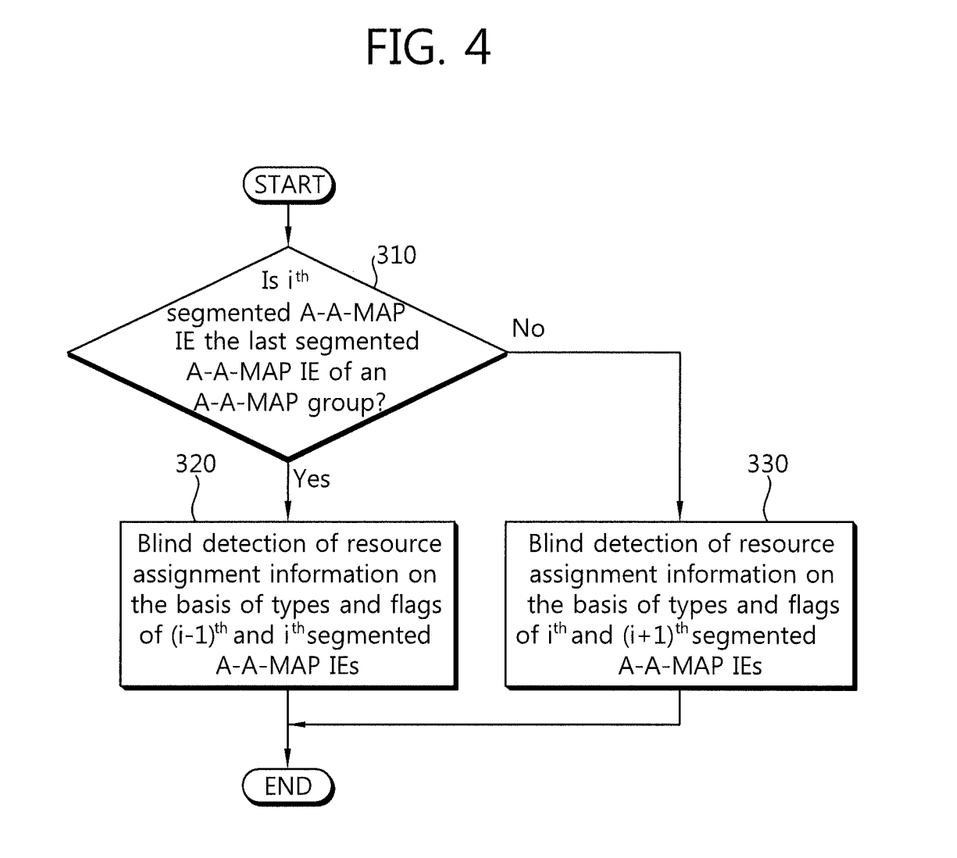
FIG. 4 shows another embodiment of the proposed method of detecting resource assignment information.

FIG. 4 shows another embodiment of the proposed method of detecting resource assignment information. FIG. 4 is an embodiment of the blind detection step 300 in FIG. 3. Particularly, FIG. 4 relates to a method of processing a plurality of segmented A-A-MAP IEs.

At step 310, a terminal determines whether an $i^{th}$ segmented A-A-MAP IE is the last segmented A-A-MAP IE of an A-A-MAP group. If, as a result of the determination, the $i^{th}$ segmented A-A-MAP IE is determined to be the last segmented A-A-MAP IE of the A-A-MAP group, the terminal performs blind detection of resource assignment information on the basis of types and flags of the $i^{th}$ and $(i-1)^{th}$ segmented A-A-MAP IEs at step 320. If, as a result of the determination at step 310, the $i^{th}$ segmented A-A-MAP IE is determined not to be the last segmented A-A-MAP IE of the A-A-MAP group, the terminal performs blind detection of resource assignment information on the basis of types and flags of the $i^{th}$ and $(i+1)^{th}$ segmented A-A-MAP IEs at step 330.

Figure 5:
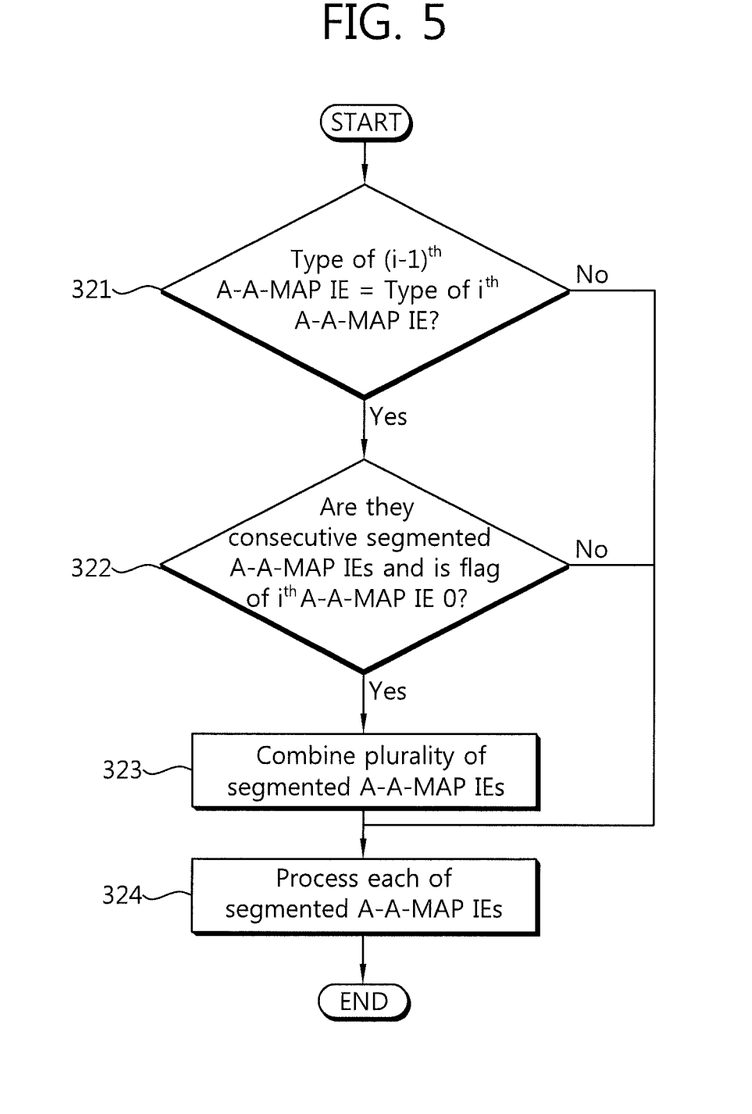
FIG. 5 shows another embodiment of the proposed method of detecting resource assignment information.

FIG. 5 shows yet another embodiment of the proposed method of detecting resource assignment information. FIG. 5 shows an embodiment of the blind detection step 320 in FIG. 4. That is, FIG. 5 relates to a method of performing blind detection in case where the $i^{th}$ segmented A-A-MAP IE is determined to be the last segmented A-A-MAP IE of the A-A-MAP group as a result of the determination at step 310 of FIG. 4. In case where the $i^{th}$ segmented A-A-MAP IE is the last segmented A-A-MAP IE of the A-A-MAP group, the flag of the $i^{th}$ segmented A-A-MAP IE should be 0 and consecutive to a previous segmented A-A-MAP IE.

At step 321, the terminal determines whether the type of an $(i-1)^{th}$ segmented A-A-MAP IE is identical with the type of the $i^{th}$ segmented A-A-MAP IE. If, as a result of the determination, the type of the $(i-1)^{th}$ segmented A-A-MAP IE is determined not to be identical with the type of the $i^{th}$ segmented A-A-MAP IE, It means that the two segmented A-A-MAP IEs are not separated segmented A-A-MAP IEs, but a single A-A-MAP IE. Accordingly, the terminal separately processes the two A-A-MAP IEs at step 324.

If, as a result of the determination at step 321, the type of the $(i-1)^{th}$ segmented A-A-MAP IE is determined to be identical with the type of the $i^{th}$ segmented A-A-MAP IE, the terminal determines that the two segmented A-A-MAP IEs are consecutive segmented A-A-MAP IEs and then determines whether the flag of the $i^{th}$ segmented A-A-MAP IE is 0 at step 322. If, as a result of the determination at step 322, the flag of the $i^{th}$ segmented A-A-MAP IE is determined to be 0, it means that the two segmented A-A-MAP IEs are segmented A-A-MAP IEs separated from one A-A-MAP, and thus the terminal combines and processes the two segmented A-A-MAP IEs at step 323. However, if, as a result of the determination at step 322, the flag of the $i^{th}$ segmented A-A-MAP IE is determined not to be 0, the terminal processes each of the A-A-MAP IEs at step 324.

Figure 6:
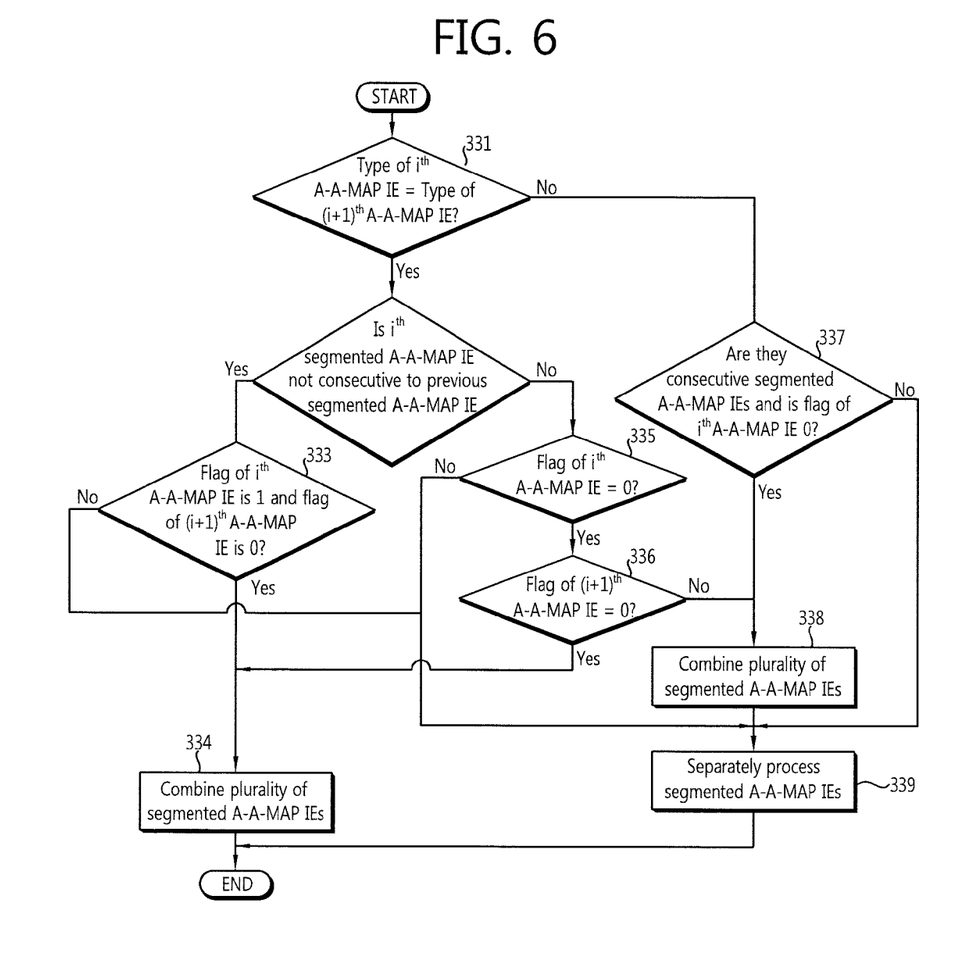
FIG. 6 shows another embodiment of the proposed method of detecting resource assignment information.

FIG. 6 shows further yet another embodiment of the proposed method of detecting resource assignment information. FIG. 6 shows an embodiment of the blind detection step 330 of FIG. 4. That is, FIG. 6 relates to a method of performing blind detection in case where the $i^{th}$ segmented A-A-MAP IE is determined not to be the last segmented A-A-MAP IE of the A-A-MAP group as a result of the determination at step 310 of FIG. 4. In case where the $i^{th}$ segmented A-A-MAP IE is determined not to be the last segmented A-A-MAP IE (in other words, (1) in case where the $i^{th}$ segmented A-A-MAP IE is a first segmented A-A-MAP IE constituting the A-A-MAP IE (i.e., the flag is 1), (2) in case where the $i^{th}$ segmented A-A-MAP IE is any one segmented A-A-MAP IEs constituting the A-A-MAP IE, or (3) in case where the $i^{th}$ segmented A-A-MAP IE is the last segmented A-A-MAP IE constituting the A-A-MAP IE (i.e., a consecutive segmented A-A-MAP IE and the flag is 0)), the $i^{th}$ segmented A-A-MAP IE needs to be combined with another segmented A-A-MAP IE.

(1) In case where the $i^{th}$ segmented A-A-MAP IE is a first segmented A-A-MAP IE constituting the A-A-MAP IE, the terminal determines whether the type of the $i^{th}$ segmented A-A-MAP IE is identical with the type of the $(i+1)^{th}$ segmented A-A-MAP IE at step 331. If, as a result of the determination, the type of the $i^{th}$ segmented A-A-MAP IE is determined to be identical with the type of the $(i+1)^{th}$ segmented A-A-MAP IE, the terminal determines whether the $i^{th}$ segmented A-A-MAP IE is not consecutive to a previous segmented A-A-MAP IE at step 332. If, as a result of the determination at step 332, the $i^{th}$ segmented A-A-MAP IE is determined not to be consecutive to a previous segmented A-A-MAP IE, the terminal determines whether the flag of the $i^{th}$ segmented A-A-MAP IE is 1 and the flag of the $(i+1)^{th}$ segmented A-A-MAP IE is 0 at step 333. If, as a result of the determination at step 333, the flag of the $i^{th}$ segmented A-A-MAP IE is determined to be 1 and the flag of the $(i+1)^{th}$ segmented A-A-MAP IE is determined to be 0, the terminal combines the plurality of separated segmented A-A-MAP IEs at step 334. If, as a result of the determination at step 333, the flag of the $i^{th}$ segmented A-A-MAP IE is determined not to be 1 or the flag of the $(i+1)^{th}$ segmented A-A-MAP IE is determined not to be 0, the terminal separately processes the A-A-MAP IEs at step 339.

(2) In case where the $i^{th}$ segmented A-A-MAP IE is any one segmented A-A-MAP IEs constituting the A-A-MAP IE, the terminal determines whether the type of the $i^{th}$ segmented A-A-MAP IE is identical with the type of the $(i+1)^{th}$ segmented A-A-MAP IE at step 331. If, as a result of the determination, the type of the $i^{th}$ segmented A-A-MAP IE is determined to be identical with the type of the $(i+1)^{th}$ segmented A-A-MAP IE, the terminal determines whether the $i^{th}$ segmented A-A-MAP IE is not consecutive to a previous segmented A-A-MAP IE at step 332. If, as a result of the determination at step 332, the $i^{th}$ segmented A-A-MAP IE is determined to be consecutive to the previous segmented A-A-MAP IE, the terminal determines whether the flag of the $i^{th}$ segmented A-A-MAP IE is 0 at step 335. If, as a result of the determination at step 335, the flag of the $i^{th}$ segmented A-A-MAP IE is determined to be 0, the terminal determines whether the flag of the $(i+1)^{th}$ segmented A-A-MAP IE is 0 at step 336. If, as a result of the determination at step 336, the flag of the $(i+1)^{th}$ segmented A-A-MAP IE is determined to be 0, the terminal combines the plurality of separated segmented A-A-MAP IEs at step 334. Meanwhile, if, as a result of the determination at step 335, the flag of the $i^{th}$ segmented A-A-MAP IE is determined not to be 0, the terminal separately processes the A-A-MAP IEs at step 339. Furthermore, if, as a result of the determination at step 336, the flag of the $(i+1)^{th}$ segmented A-A-MAP IE is determined not to be 0, the terminal combines the plurality of separated segmented A-A-MAP IEs at step 338 and processes the combined A-A-MAP IEs at step 339.

(3) In case where the $i^{th}$ segmented A-A-MAP IE is the last segmented A-A-MAP IE constituting the A-A-MAP IE, the terminal determines whether the type of the $i^{th}$ segmented A-A-MAP IE is identical with the type of the $(i+1)^{th}$ segmented A-A-MAP IE at step 331. If, as a result of the determination, the type of the $i^{th}$ segmented A-A-MAP IE is determined not to be identical with the type of the $(i+1)^{th}$ segmented A-A-MAP IE, the terminal determines whether the $i^{th}$ segmented A-A-MAP IE is consecutive to a previous segmented A-A-MAP IE and the flag of the $i^{th}$ segmented A-A-MAP IE is 0 at step 337. If, as a result of the determination at step 337, the $i^{th}$ segmented A-A-MAP IE is determined to be consecutive to the previous segmented A-A-MAP IE and the flag of the $i^{th}$ segmented A-A-MAP IE is determined to be 0, the terminal combines the plurality of separated segmented A-A-MAP IEs at step 338 and processes the combined A-A-MAP IEs at step 339. Meanwhile, if, as a result of the determination at step 337, the $i^{th}$ segmented A-A-MAP IE is determined not to be consecutive to the previous segmented A-A-MAP IE or the flag of the $i^{th}$ segmented A-A-MAP IE is determined not to be 0, the terminal separately processes the A-A-MAP IEs at step 339.

Figure 7:
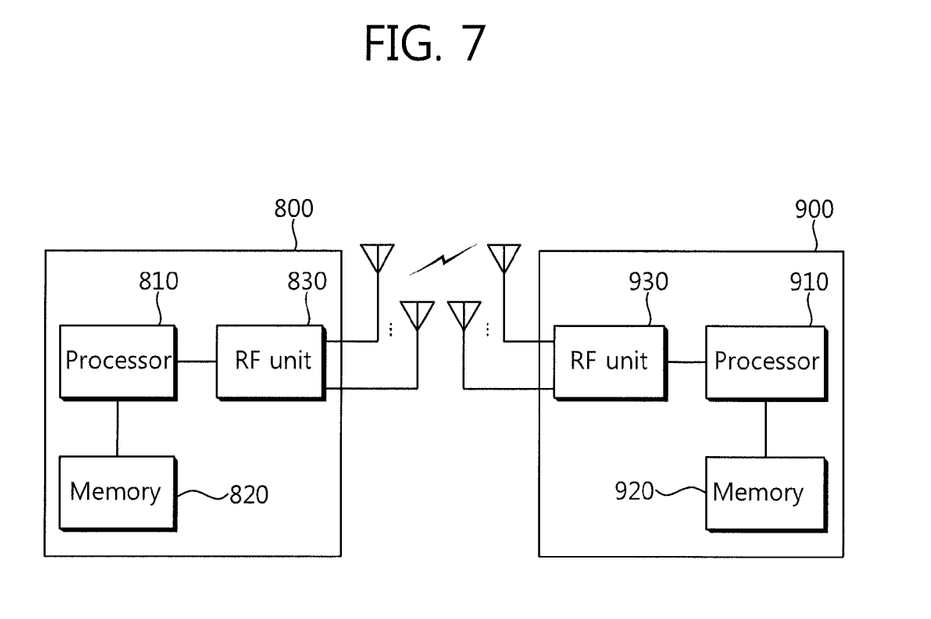
FIG. 7 is a block diagram showing a base station and a terminal in which the embodiments of the present invention are implemented.

FIG. 7 is a block diagram showing a BS and a terminal in which the embodiments of the present invention are implemented.

The BS 800 includes a processor 810, memory 820, and a Radio Frequency (RF) unit 830. The processor 810 implements the proposed functions, processes, and/or methods. The layers of a wireless interface protocol may be implemented by the processor 810. The memory 820 is connected to the processor 810 and configured to store various pieces of information for driving the processor 810. The RF unit 830 is connected to the processor 810 and configured to transmit or receive or both radio signals.

The terminal 900 includes a processor 910, memory 920, and an RF unit 930. The processor 910 implements the proposed functions, processes, and/or methods. The processor 910 detects the number of A-A-MAP groups and the number of A-A-MAP IEs included in each of the A-A-MAP groups, extracts the type and flag of each of the A-A-MAP IEs, and performs blind detection of resource assignment information on the basis of the type and flag of each of the A-A-MAP IEs. The layers of a wireless interface protocol may be implemented by the processor 910. The memory 920 is connected to the processor 910 and configured to store various pieces of information for driving the processor 910. The RF unit 930 is connected to the processor 910 and configured to transmit or receive or both radio signals.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, resource assignment information can be efficiently processed irrespective of whether the resource assignment information has been separated.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for a user equipment to detect resource assignment information in a wireless communication system, the method comprises:

detecting, at the user equipment, a number of Assignment Advanced-MAP (A-A-MAP) groups and a number of a plurality of A-A-MAP Information Elements (IEs) included in each of the A-A-MAP groups;

extracting a type and flag of each of the plurality of A-A-MAP IEs; and performing blind detection of resource assignment information on the basis of the type and flag of each of the A-A-MAP IEs, wherein performing the blind detection of the resource assignment information comprises determining whether a first A-A-MAP IE is a last A-A-MAP IE of an A-A-MAP group to which the first A-A-MAP IE belongs.

2. The method of claim 1, wherein performing the blind detection of the resource assignment information comprises performing the blind detection of resource assignment information on the basis of a type and flag of the first A-A-MAP IE and a type and flag of a second A-A-MAP anterior to the first A-A-MAP IE, in case where the first A-A-MAP IE is the last A-A-MAP IE of the A-A-MAP group.

3. The method of claim 2, wherein in case where the type of the first A-A-MAP IE is identical with the type of the second A-A-MAP IE, the first A-A-MAP IE is a consecutive and separated A-A-MAP IE, and the flag of the first A-A-MAP IE is 0, the blind detection of the resource assignment information is performed by combining the first A-A-MAP IE and the second A-A-MAP IE.

4. The method of claim 1, wherein in case where the first A-A-MAP IE is not the last A-A-MAP IE of the A-A-MAP group, the blind detection of the resource assignment information is performed on the basis of the type and flag of the first A-A-MAP IE and a type and flag of a third A-A-MAP IE posterior to the first A-A-MAP IE.

5. The method of claim 4, wherein in case where the type of the first A-A-MAP IE is identical with the type of the third A-A-MAP IE, the first A-A-MAP IE is not a consecutive and separated A-A-MAP IE, the flag of the first A-A-MAP IE is 1, and the flag of the third A-A-MAP IE is 0, the blind detection of the resource assignment information is performed by combining the first A-A-MAP IE and the third A-A-MAP IE.

6. The method of claim 4, wherein in case where the type of the first A-A-MAP IE is identical with the type of the third A-A-MAP IE, the first A-A-MAP IE is a consecutive and separated A-A-MAP IE, the flag of the first A-A-MAP IE is 0, and the flag of the third A-A-MAP IE is 0, the blind detection of the resource assignment information is performed by combining the first A-A-MAP IE and the third A-A-MAP IE.

7. The method of claim 4, wherein in case where the type of the first A-A-MAP IE is not identical with the type of the third A-A-MAP IE, the first A-A-MAP IE is a consecutive and separated A-A-MAP IE, and the flag of the first A-A-MAP IE is 0, the blind detection of the resource assignment information is performed by combining the first A-A-MAP IE and the third A-A-MAP IE.

8. The method of claim 1, wherein information about the number of A-A-MAP groups and the plurality of A-A-MAP IEs included in each of the A-A-MAP groups is transmitted through a non-user-specific A-A-MAP IE.

9. An apparatus for detecting resource assignment information, comprising:

a Radio Frequency (RF) unit configured to transmit or receive a radio signal; and a processor, connected to the RF unit, and configured to:

detect a number a number of Assignment Advanced-MAP (A-A-MAP) groups and a number of a plurality of A-A-MAP Information Elements (IEs) included in each of the A-A-MAP groups;

extract a type and flag of each of the plurality of A-A-MAP IEs; and perform blind detection of resource assignment information on the basis of the type and flag of each of the A-A-MAP IEs, wherein the processor further performs the blind detection of the resource assignment information by determining whether a first A-A-MAP IE is a last A-A-MAP IE of an A-A-MAP group to which the first A-A-MAP IE belongs.

10. The apparatus of claim 9, wherein in case where the first A-A-MAP IE is the last A-A-MAP IE of the A-A-MAP group, the processor further performs the blind detection of the resource assignment information on the basis of a type and flag of the first A-A-MAP IE and a type and flag of a second A-A-MAP anterior to the first A-A-MAP IE.

11. The apparatus of claim 9, wherein in case where the first A-A-MAP IE is not the last A-A-MAP IE of the A-A-MAP group, the processor further perform the blind detection of the resource assignment information on the basis of the type and flag of the first A-A-MAP IE and a type and flag of a third A-A-MAP IE posterior to the first A-A-MAP IE.

* * * * *